Figure 6:
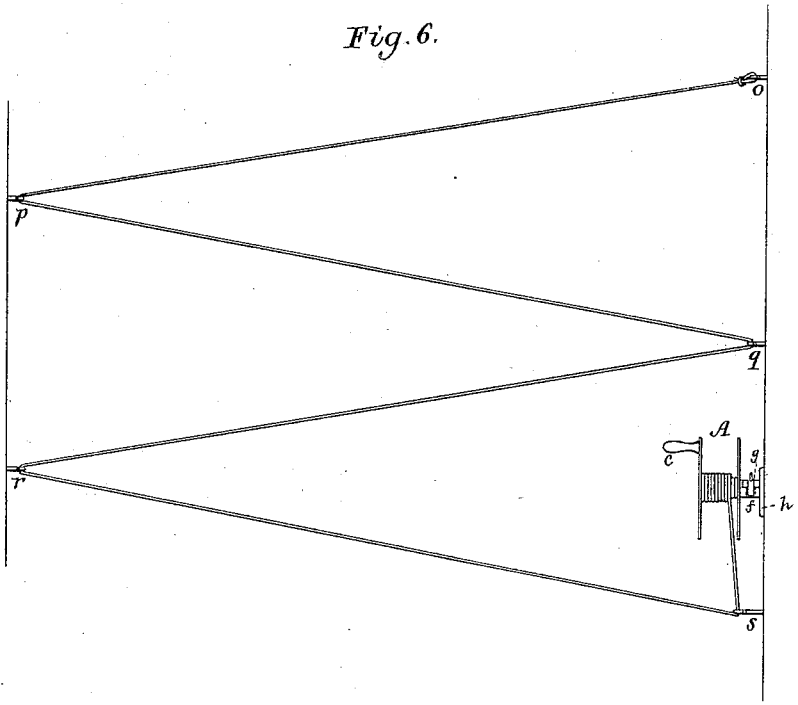

(No Model.) 2 Sheets—Sheet 1.
F. R. FRENCH.
CLOTHES LINE REEL.
No. 424,054. Patented Mar. 25, 1890.
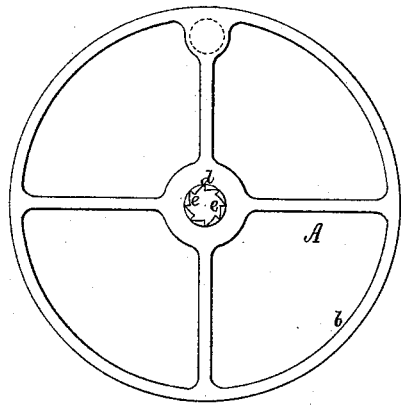
Fig. 1.
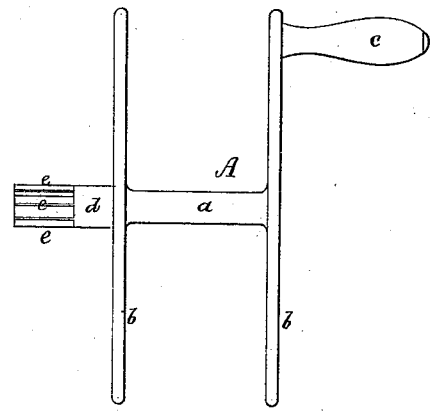
Fig. 2.
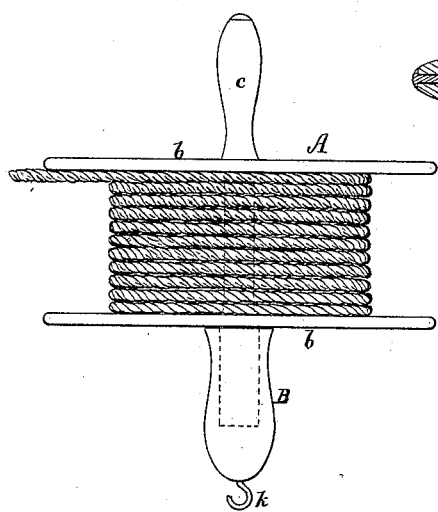
Fig. 5.
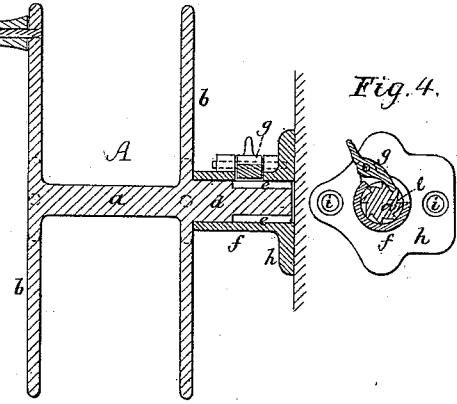
Fig. 3.
Fig. 4.
Witnesses.
A. F. Piper
W. E. Piper
Inventor.
Fred R. French
by Singleton & Piper, atty's (No Model.)

F. R. FRENCH.
CLOTHES LINE REEL.

No. 424,054.

2 Sheets—Sheet 2.

Patented Mar. 25, 1890.

Witnesses
A. F. Piper
W. E. Piper

Inventor.
Fred. R. French
by Singleton & Piper, atty's.

UNITED STATES PATENT OFFICE.

FRED. R. FRENCH, OF BROCKTON, MASSACHUSETTS.

CLOTHES-LINE REEL.

SPECIFICATION forming part of Letters Patent No. 424,054, dated March 25, 1890.

Application filed May 5, 1888. Serial No. 272,915. (No model.)

*To all whom it may concern:*

Be it known that I, FRED. R. FRENCH, a citizen of the United States, residing at Brockton, in the county of Plymouth and State of Massachusetts, have invented certain new and useful Improvements in Clothes-Line Reels; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 is a side view and Fig. 2 a front view of a clothes-line reel made in accordance with my invention. Fig. 3 is a longitudinal section of said reel as applied to its sustaining-socket. Fig. 4 is a cross-section of the said socket and the end $d$ of the reel-arbor. Fig. 5 represents the reel as it is to be held in the hand while distributing or arranging the line for use. Fig. 6 is an illustration of the manner of arranging the reel relatively to the supporting-hooks.

The nature of my invention is defined in the claim hereinafter presented.

In the drawings, A denotes the clothes-line reel, made in one piece, it consisting of a shaft or arbor $a$ and two heads $b\ b$, which are represented as spoked wheels, one of which is provided with a handle $c$ to enable the reel to be revolved when the cylindrical end $d$ of its arbor, which is provided with ratchet-teeth $e$, is placed within a cylindrical socket $f$, secured to the side of a house or to a post or to a vertical surface, as represented in Fig. 3.

The socket $f$ is provided with a pawl $g$, arranged in an opening therein and pivoted to ears forming a part of said socket, as shown, to operate with the teeth $e$ of the ratchet, and also has a flange $h$, provided with screw-holes $i\ i$ to receive screws to secure the socket to its supporting-surface.

B is an auxiliary handle provided with a cylindrical socket to receive the end $d$ of the arbor, said handle to be held in the hand to support the reel while the line is being arranged or placed in position about its supporting-hooks, as will be hereinafter set forth.

In using the reel we will now suppose it to be supplied with a line coiled about its arbor, the inner end of the said line being secured to the arbor and the reel supported in the handle B, and held in the hand of a person in the position represented in Fig. 5. After securing the outer end of the line to the hook O (see Fig. 6) and afterward passing it over the other hooks $p\ q\ r\ s$ successively, but not winding it around them, the reel is to be removed from the handle B and its end $d$ inserted in the socket $f$. Then by turning the reel by its handle $c$, the pawl being in engagement with the ratchet, the line can be strained to the necessary extent and held in that state by the pawl and ratchet, substantially as shown in said Fig. 6. If the line becomes stretched under the weight of the clothes, so as to sag too much, it can easily be tightened by revolving the reel. Furthermore, if the line becomes wet and is liable to be strained to too great an extent by turning the reel, so as to relieve the pawl, it can be thrown out of the teeth of the ratchet and the line slackened, as may be desired.

The handle B is provided with a hook $k$, as shown, to admit of its being suspended from a nail or hook when not required, or from the rim of either of the heads $b$ of the reel when it is in place in its socket $f$.

What I claim as my invention is—

The clothes-line reel A, consisting of the two heads and the arbor having the projecting cylindrical end provided with teeth, all made in one piece, the said cylindrical end being adapted to be inserted in a socket having in it a pawl arranged in an opening therein and a flange with screw-holes, and when required the cylindrical end to be inserted in the socket of an auxiliary handle, substantially as and for the purpose described.

In testimony whereof I affix my signature in presence of two witnesses.

FRED. R. FRENCH.

Witnesses:
JOHN F. SHEEHAN,
FRANCIS B. GARDNER.